3,231,510
**MANUFACTURE OF MIXED ALKYL
TETRAALKYLLEAD PRODUCTS**
Rex D. Closson, Royal Oak, Mich., assignor to Ethyl Corporation, New York, N.Y., a corporation of Virginia
No Drawing. Filed May 1, 1962, Ser. No. 191,421
6 Claims. (Cl. 252—386)

This invention relates to the manufacture of tetraalkyllead compounds. More particularly, the invention relates to the manufacture of the so-called mixed alkyllead compounds, that is, those compounds of lead wherein each molecule contains dissimilar alkyl groups.

It has long been known that the production of compositions having mixed alkyllead compounds can be attained by a redistribution of two or more different tetraalkyllead compounds. The tetraalkyllead compounds may be different in having different alkyl groups, but each compound having only one specific alkyl group. Alternatively, each compound can have different alkyl groups, but the compounds would differ one from the other in the numbers of the different alkyl groups present in each compound.

For example, it has been appreciated that tetraethyllead and tetramethyllead could be interreacted under appropriate conditions, and with the aid of a catalyst, to achieve a product having a plurality of mixed alkyllead compounds, viz., a plurality of compounds having both methyl and ethyl groups thereon. Thus, in the interreaction of tetraethyllead and tetramethyllead, in equimolar proportions, the product obtained will contain minor amounts of both tetraethyllead and tetramethyllead, but the predominant components will be triethylmethyllead, diethyldimethyllead and ethyltrimethyllead. Another illustration of a redistribution reaction is the reaction of a mixture of, for example, trimethylethyllead and methyl triethyllead.

A process for carrying out the above type reactions has been disclosed in Calingaert et al. Patent 2,270,108. According to that patent, a chemical catalyst is necessary, and the catalysts employed include, for example, diethyl zinc, zinc fluoride, mercuric chloride, boron trifluoride, dimethyl aluminum chloride, zirconium chloride, phosphorus trichloride, and ferric chloride. In other words, all the catalysts heretofore known have been halogen containing compounds or certain organometallic compounds such as diethyl zinc.

Certain alkyl-halogen compounds of aluminum are quite effective catalysts, such as methyl aluminum sesquichloride. Halides such as aluminum chloride, and particularly boron trifluoride, or the etherate thereof, are quite successful. However, processes catalyzed by chemically active catalysts such as above listed exhibit certain deficiencies in commercial operation. In particular, commercial operations have suffered because the catalysts employed tend to cause a degradation of a minor quantity of the lead tetraalkyl charged, which represents a loss in that the degradation products must be removed from the final product. Further, certain of the prior art catalysts are quite hazardous and difficult to handle. For example, boron trifluoride is, itself, a very toxic material, and in addition, is a gaseous material. It is recognized, of course, that the tetraalkyllead feed materials and the mixed alkyllead products to be obtained are themselves toxic materials, but obviously it is undesirable to be forced to handle yet an additional toxic material. Another deficiency of the prior techniques arises from the fact that the preferred chemical catalysts heretofore known react with certain minor components present in the final products in which the mixed alkyllead compounds appear. Thus, as tetraalkyllead compounds are employed in antiknock motor fuel additives in which a dye is added, it would be quite desirable if such dye could be added at the very beginning, without requiring an additional blending operation after the redistribution of two tetraalkyllead materials. However, this has not been feasible in the past because the prior art redistribution catalysts react with or adsorb the dye and destroy its effectiveness.

The principal object of the present invention is to provide a new and highly efficient process for the redistribution of at least two different tetraalkyllead compound feeds to provide a desired mixed alkyl tetraalkyllead product. A more particular object is to provide such a process wherein the redistribution of the alkyl groups necessary is not accompanied by any significant loss of lead value, viz., loss by conversion of the lead from a lead alkyl moiety to another non-utilizable lead compound. Still another object is to provide an effective redistribution process which does not employ chemically active catalysts. By this is meant that no catalyst is employed which is susceptible of undergoing a chemical reaction with the tetraalkyllead components themselves or components present with the tetraalkyllead materials. Other objects will appear hereinafter.

The present invention comprises contacting at least two different tetraalkyllead compounds, susceptible to redistribution of the alkyl groups, with a high surface inorganic agent selected from the group consisting of activated aluminosilicate clays, synthetic zeolites, zeolite, activated silica and activated alumina. The contacting is continued for a sufficient period of time to achieve the desired degree of redistribution, which, occasionally, is deliberately selected at a level below the potential maximum or theoretical redistribution. The temperature of operation is not critical, although, of course, temperatures above the decomposition temperature of the components are to be necessarily avoided. A great degree of flexibility in the mode of contacting and in the time of contacting is permissible, according to the results desired.

The inorganic high surface agents employed do not exhibit precisely definable chemical characteristics known to be responsible for the effectiveness of the process. Inorganic materials having high surfaces, are not always effective. Thus, diatomaceous earth, and activated carbon have been found to be virtually ineffective for the desired reaction. Among the modes of contacting which can be employed are batch operations in which a selected quantity of the high surface inorganic material in subdivided form is added to the raw mixture, stirring is provided and redistribution will occur to the desired extent in a satisfactory period of time, depending upon the concentration of material employed. Another highly effective mode of contacting involves passing the feed stock through a stationary column or bed of the material, either in downflow or upflow. The rates are adjusted as desired to provide the desired degree of redistribution. Batch, semi-batch, and continuous processing techniques, are of course readily available. For most applications, the use of a stationary bed of the high surface material and percolation of the feed materials therethrough, is highly effective.

The invention is not limited to the use of highly concentrated tetraalkyllead feed components, but in fact can be used to process two different antiknock compositions each having a single tetraalkyllead component therein, as well as halogenated hydrocarbon materials employed as scavengers and other constituents found in commercial antiknock liquid compositions.

*Example 1*

Into a 500 milliliter three neck round bottom flask, provided with mechanical stirrer, a reflux condenser and a dropping funnel were charged 11.8 grams of an activated clay having the following approximate composition.

| Component: | Weight percent |
|---|---|
| $SiO_2$ | 74 |
| $Al_2O_3$ | 17.5 |
| $MgO$ | 4.5 |
| $Fe_2O_3$ | 1.4 |

Also charged were 64.7 grams of tetraethyllead and 53.5 grams of tetramethyllead, thus providing a TEL:TML mole ratio of 1.2:1.

The flask was heated at about 55 to 65° C. for two hours while stirring vigorously. The activated clay provided was in the form of subdivided particles, predominantly all passing a 10 mesh screen.

At the end of the above reaction period, the contents of the flask were cooled and filtered to obtain a solids-free filtrate.

The filtered liquid was then distilled at a reduced pressure, initially 50 millimeters of mercury, and dropping over a distillation period of several hours, to about 5 millimeters mercury pressure. The distillation curve and the volume of distillate fractions showed the following components were present in the molal concentrations given below.

| Compound: | Mole percent |
|---|---|
| Tetramethyllead | 2.7 |
| trimethylethyllead | 20.1 |
| Dimethyldiethyllead | 41.7 |
| Methyltriethyllead | 27.7 |
| Tetraethyllead | 2.8 |

The distillate composition reported above was for a recovery of over 90 weight percent, a small amount being lost in handling and a residue of about 5 percent being not distilled or analyzed. Generally, the foregoing experiment showed approximately complete redistribution of the alkyl groups.

To illustrate the operation of the process using a stationary bed reaction zone, the following example is illustrative.

*Example 2*

A glass column was packed with activated clay having the same composition as the clay used in Example 1, but confined to the 10–20 mesh fraction. The bed employed was about 8 inches in depth. An equimolal mixture of tetraethyllead and tetramethyllead, accompanied by toluene to the extent of about 20 weight percent of the tetramethyllead, was fed to the top of this column and allowed to flow therethrough at room temperature, of about 24° C. The mixture was fed at the rate of about 2 (1.9–2.4) grams per gram of catalyst per hour, the flow rate being controlled by withdrawal at the bottom. Operation was continued for a 30 hour period, at which time about 66 grams of feed had been passed for every gram of the clay bed. Complete redistribution of the entire feed was accomplished, as shown by the following analysis of the discharged material.

| Compound: | Mole percent |
|---|---|
| Tetramethyllead, TML | 6.9 |
| Trimethylethyllead, $Me_3EtPb$ | 20.2 |
| Dimethyldiethyllead, $Me_2Et_2Pb$ | 40.7 |
| Methyltriethyllead, $MeEt_3Pb$ | 26.6 |
| Tetraethyllead, TEL | 5.6 |

Without changing the clay charge in the column, an additional supply of feed was passed through under the same conditions for an additional 28 hours, and analysis of the product showed that the activity was maintained and complete redistribution, according to approximately the foregoing analysis, was obtained.

The theoretical complete redistribution products from a feed having equimolal proportions of tetraethyllead and tetramethyllead is as follows.

| Compound: | Mole percent |
|---|---|
| TML | 6.25 |
| $Me_3EtPb$ | 25.0 |
| $Me_2Et_2Pb$ | 37.5 |
| $MeEt_3Pb$ | 25.0 |
| TEL | 6.25 |

The foregoing theoretical distribution assumes equivalent mobility of each alkyl group present. This assumption is not fully accurate, and distributions containing more than the 37.5 mole percent of the dimethyldiethyllead component are frequently attained. About the highest concentration of this component which can be obtained is of the order of about 110 percent of the above listed molal concentration. For reference purposes herein, the term 100 percent redistribution is adopted as equivalent to a molal concentration of 37.5 percent, as in the above table.

A particular benefit of the improved process is the ability to accomplish the desired redistribution in the presence of other components of the desired final antiknock mixtures for which the alkyllead is intended. This is highly advantageous inasmuch as it provides the opportunity of providing, rapidly, individual, mixed alkyl-tetraalkyllead antiknock compositions according to rapidly changing needs, but using only two antiknock mixtures as inventory stocks. It is therefore now possible to provide, from two previously blended antiknock mixtures a mixed alkyl tetraalkyllead containing antiknock composition tailored for the needs of a particular fuel, without maintaining an inventory of such a composition. More specifically, by way of illustration, it is now possible to maintain an inventory of, for example, a tetraethyllead containing antiknock mixture, and a tetramethyllead antiknock mixture, with all the usual other constituents present, and to establish directly from such mixtures, new antiknock mixtures having a desired mixed methyl-ethyl tetraalkyllead content, without the necessity of maintaining an inventory of the latter, or without the necessity of reblending or redyeing. The following example illustrates a redistribution of commercial but non-dyed TML (tetramethyllead) and TEL (tetraethyllead) antiknock liquids.

*Example 3*

The charge in this operation was of the following composition.

| Component: | Weight percent |
|---|---|
| Tetraethyllead | 32.5 |
| Tetramethyllead | 26.8 |
| Toluene | 5.6 |
| 1,2-dibromoethane | 17 |
| 1,2-dichloroethane | 18 |

In this mixture, the tetraethyllead and tetramethyllead were approximately in equimolal quantities and the halogenated ethane components were in the proportions approximating a commercial mixture. The mixture was fed through a column corresponding to that used in Example 2 above for an extended period with the results shown on the following table:

| Rate, g./(10g. solids) (hr.) | Time (hr.) | Product, mole percent | | | | |
|---|---|---|---|---|---|---|
| | | TML | Me₃EtPb | Me₂Et₂Pb | MeEt₃Pb | TEL |
| 120 | 3.5 | | | | | |
| 100 | 1.8 | | | | | |
| 81 | 1.9 | 7.4 | 21.4 | 38.1 | 27.0 | 5.8 |
| 55 | 2.9 | ¹(9.8 | 20.5 | 37.4 | 25.7 | 6.9) |
| 45 | 3.8 | 6.9 | 21.7 | 39.2 | 26.9 | 5.3 |

¹ spot sample.

From the foregoing data, it is seen that the process is equally as effective when the feed streams include, not only the tetraalkyllead compounds to be redistributed, but also components, particularly halogen containing compounds, which are provided for a final antiknock liquid composition. The practical implications of this are, of course, extremely important as already indicated. Thus, it is possible to provide antiknock liquid compositions, wherein only one tetraalkyllead compound is present, but at the same time two such compositions can be readily treated or reacted together to give at will mixed alkyl tetraalkyllead components to serve a particular need.

In addition to being unaffected by the presence of haloethane compounds, as shown by Example 3 above, the process is also highly advantageous in that it does not affect the color of the materials being processed. This, also, is quite important, as tetraalkyllead antiknock compositions are provided with a strong dye so that leaks which can possibly occur are readily detectable, and the final fuel composition can be identified.

*Example 4*

The operation of Example 3, above, was repeated except that the antiknock liquids provided were both dyed with a water insoluble orange dye, phenyl azo 2-napthyl, in sufficient concentration to provide a recognized stain or color intensity in the final fuels. The operation was carried out as before, and vapor phase chromatography analysis again showed that approximately complete redistribution had been achieved. In addition, the intensity of the orange color was the same in the treated product as in the feed materials. Similar operations were carried out with a feed containing a blue dye, with equal success.

As already stated, instead of the activated clay used in the foregoing examples, certain other inorganic, relatively high surface materials are also quite effective, as is shown by the following examples.

*Example 5*

In this operation, the same operating technique as in Example 2 was applied, except that the contact material employed was an activated alumina (Kaiser Chemical grade XA-281) with an average pore diameter of 40 Angstrom units. The feed mixture provided in this case was an equimolal mixture of tetraethyllead and tetramethyllead, accompanied by dry toluene in the proportions of about 20 weight percent based on the tetramethyllead. The feed was percolated through an 8 inch column at the rate of approximately one gram per hour per gram of solids, and this operation was continued for approximately 5 hours. Analysis of the product showed the following concentration of alkyllead components.

| Component: | Mole percent |
|---|---|
| TML | 8.87 |
| Me₃EtPb | 27.0 |
| Me₂Et₂Pb | 34.9 |
| MeEt₃Pb | 21.8 |
| TEL | 7.4 |

*Example 6*

In this operation, the same procedure as in the above example was followed, except that the rate of feed was in the range of about two grams per gram of solids per hour, and the high surface solids were activated silica gel (Fisher Scientific Company) which was screened to pass a 28 mesh screen and be retained on a 200 mesh screen. The operation was continued for about six hours, and a composite analysis of the products shows the following tetraalkyllead component distribution.

| Component: | Mole percent |
|---|---|
| TML | 6.2 |
| Me₃EtPb | 23.4 |
| Me₂Et₂Pb | 41.7 |
| MeEt₃Pb | 23.2 |
| TEL | 5.4 |

*Example 7*

The same procedure as in Example 3 was followed, except that a synthetic zeolite, having the approximate water free composition $Na_2O \cdot Al_2O_3 \cdot 2SiO_2$ was used. Such materials have a pore diameter of about 4.2 Angstrom units, and internal surface area of from 700 to 800 square meters per gram. Preparatory methods are described in Patents 2,882,243-4. About 130 g. of synthetic zeolite were used. Contacting was with 10, 20 and 100 gram portions, at the rates of 460, 19 and 4 grams of feed per gram of solids per hour. Redistribution to about 102 percent was obtained.

When natural zeolites are substituted for the acid activated clays, activated silicas, activated alumina, and synthetic zeolite used in the above examples, similar results are obtained.

When the length of the column is approximately doubled, and the gross feed rate is maintained the same, substantially complete redistribution is achieved.

The life of the contacting solids employed in the process is very high, so that regeneration is not normally an economic necessity. However, regeneration can be achieved readily by steaming the solids, and thereafter drying at a temperature of about 100–125° C., preferably with an inert gas being passed through the solids.

The following example illustrates operation on a substantial scale and shows the effect of temperature variation.

*Example 8*

A three inch standard steel pipe reactor was charged with about 12 pounds of activated clay, having the composition recited in Example 1, the clay being in the 10–20 mesh size. (One commercial source of such clay is Filtrol grade 24, obtainable from Filtrol Corporation.)

The feed to the reactor was a blend of tetramethyllead and tetraethyllead containing antiknock mixtures, having about 20 weight percent toluene, based upon the tetramethyllead, and dichloroethane and dibromoethane in the molal proportions of 1.0 mole and 0.5 mole, respectively, per mole of the alkyllead constituents. The antiknock mixture also contained orange dye and minor amounts of other components. The feed was passed through the bed in an upward manner, so that the column of solids was flooded at all times. The rate of feed was adjusted to provide at least 100 percent redistribution. Temperatures were varied during portions of the operation and feeds were maintained at the maximum permissible at such temperatures, as shown by the following table.

| Temperature, °C.: | Feed rate (lb. of solids) (hr.) |
|---|---|
| 30 | 2 |
| 50 | 8 |
| 70 | 12 |
| 85 | 16 |

When operating at 30° C., it was found that after treating approximately 119 pounds of mixed feed per pound of a solid that the activity appreciably decreased. At the other temperatures shown, no limit of activity was reached. A total of 2,140 pounds of feed was processed per pound of clay solids with no falling-off in conversion and virtually complete recovery of the tetraalkyllead was obtained.

The same operation was carried out, but instead of having equimolar proportions of tetramethyllead and tetraethyllead in the feed, proportions were adjusted to one mole of tetramethyllead per three of tetraethyllead, and three moles of tetramethyllead per one mole of tetraethyllead, and substantially complete redistribution was obtained in each instance.

Although tetraethyllead and tetramethyllead are the most significant tetraalkyllead source materials at the present time, the process is equally applicable to other alkyllead compounds. Thus, when feed mixtures containing tetra-n-propyl and tetraethyllead, tetraisobutyllead and tetraethyllead, tetra-n-butyllead and tetraethyllead and tetra-n-propyllead and tetramethyllead are substituted in the foregoing examples, corresponding results are achieved.

As illustrated by the examples given above, temperatures can be ordinary ambient temperatures if desired, but increase of the temperature to 85–90° C., illustratively, provides a substantial increase in capacity. However, the temperature is not critical as shown by the results obtained. Temperatures so high as to approach the thermally unstable range of the tetraalkyllead compounds fed should be avoided. The concurrent presence of halogenated hydrocarbon components and of toluene, as in numerous of the examples above, reduces thermal decomposition.

In the foregoing examples the high surface solids are employed "pure," i.e., without any adulterants or additives. In certain instances it is desirable to provide additional inert materials or fillers such as sand etc. In addition, it will be understood other chemical constituents may be present or combined in certain of the high surface inorganic solids without having a deleterious effect on the performance thereof.

The precise size of the particles of solids employed is not critical. The significant feature of the materials is in the finite crystals composition and arrangement, rather than in the gross particle size. It necessarily will be clear, however, that the use of physical aggregates of too fine a particle size will result in quite slow flow in embodiments of the process characterized by the flow of the feed material through a solid stationary bed of the material. On the other hand, embodiments, such as Example 1 in which the solids are added to a stirred liquid mixture of the material being processed, and a batch redistribution is carried out, permit very fine materials to be employed. These are then readily filterable by conventional, high quality filtration operations. Generally, it is preferred that the particle aggregates in fixed bed operation shall be at least retained on a 200 mesh, and desirably not greater than a ten mesh. An even more preferred particle range size for such embodiments is 10 to 20 mesh particles.

As previously described, the feeds to the process, when using two different tetraalkyllead compounds where the alkyl groups on one of such compounds are identical in the compound, can vary widely. Equimolal proportions are most customary. However, the feed stock can be varied as desired according to the desired proportions of the different alkyl groups in the final product. In the case of products having methyl and ethyl alkyl groups, the usual range of feed proportions is from about 0.2 to 4 moles of tetramethyllead per mole of tetraethyllead.

I claim:

1. A process for the redistribution of at least two different tetraalkyllead compounds susceptible to redistribution comprising contacting said compounds at a temperature below the temperature of decomposition with a high surface inorganic solid selected from the group consisting of activated aluminosilicate clays, synthetic zeolites, zeolites, activated silicas and activated aluminas for a time sufficient to redistribute the alkyl groups.

2. The process of making an antiknock liquid having the following tetraalkyllead components therein:

tetramethyllead
trimethylethyllead
dimethyldiethyllead
methyltriethyllead
tetraethyllead and in addition thereto other constituents of an antiknock liquid including halogenated hydrocarbon scavenger components, dye, and inert hydrocarbons, said process comprising mixing tetramethyllead and tetraethyllead and other constituents of antiknock liquids including halogenated hydrocarbon scavenger components, dye and inert hydrocarbons, the tetramethyllead being in proportions of from 0.2 to 4 moles per mole of tetraethyllead, and contacting the so-formed mixture at a temperature of not over about 90° C. with inorganic high surface solids consisting predominantly of particles passing a ten mesh screen and being retained on a 200 mesh screen and being selected from the group consisting of activated aluminosilicate clays, synthetic zeolites, zeolites, activated silicas and activated aluminas, and the contacting being at a rate of 1 to about 500 parts by weight per part of solids per hour.

3. The process of claim 2 in which the inert hydrocarbons are dry.

4. The process of claim 3 wherein the contacting is carried out at a temperature of from about 50° C. to about 85° C.

5. The process of claim 3 further characterized by said inorganic high surface solids being substantially water-free.

6. The process of claim 1 further characterized by said inorganic high surface solids being essentially dry.

References Cited by the Examiner

UNITED STATES PATENTS 2,407,307   9/1946   Linch _____ 260—437

TOBIAS E. LEVOW, *Primary Examiner.*

ABRAHAM H. WINKELSTEIN, *Examiner.*